United States Patent
Lee et al.

(10) Patent No.: US 10,523,574 B2
(45) Date of Patent: Dec. 31, 2019

(54) APPARATUS AND METHOD FOR CONTROLLING DATA TRANSMISSION SPEED IN WIRELESS COMMUNICATION SYSTEM

(71) Applicant: Samsung Electronics Co., Ltd., Gyeonggi-do (KR)

(72) Inventors: Hyungho Lee, Seoul (KR); Jung Shin Park, Seoul (KR); Joohyung Lee, Gwacheon-si (KR); Jinsung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 15/224,059

(22) Filed: Jul. 29, 2016

(65) Prior Publication Data

US 2017/0034735 A1 Feb. 2, 2017

(30) Foreign Application Priority Data

Jul. 31, 2015 (KR) .................. 10-2015-0109067

(51) Int. Cl.
*H04W 28/02* (2009.01)
*H04L 12/805* (2013.01)
(Continued)

(52) U.S. Cl.
CPC ............ *H04L 47/36* (2013.01); *H04L 47/18* (2013.01); *H04L 47/193* (2013.01);
(Continued)

(58) Field of Classification Search
CPC .......... H04W 28/0273; H04W 28/0278; H04L 47/36; H04L 47/193; H04L 47/27; H04L 69/16; H04L 69/163
See application file for complete search history.

(56) References Cited

U.S. PATENT DOCUMENTS 8,780,705 B2  7/2014 Robin et al.
8,902,777 B1 * 12/2014 Huang ............ H04W 28/0205
                                                  370/252
(Continued)

OTHER PUBLICATIONS

"3rd Generation Partnership Project; Technical Specification Group Radio Access Network; Evolved Universal Radio Access (E-UTRA) Medium Access Control (MAC) Protocol Specification (Release 8), 3GPP", 3GPP TS 36.321 V8.0.0 (Dec. 2007), 23 pgs.

(Continued)

*Primary Examiner* — Jamal Javaid

(57) ABSTRACT

A 5G or a pre-5G communication system supports a higher data transmission rate than a system after a 4G communication system such as LTE. A transmission device in a wireless communication system according to an embodiment of the present disclosure includes: a control unit that determines a maximum size of data that can be transmitted, based on network information, and determines transmission speeds of multiple transmission control protocol (TCP) connections, based on the size of the data that can be transmitted, respectively; and a communication unit that transmits data to a reception device through the multiple TCP connections based on the transmission speeds. A reception device in a wireless communication system according to an embodiment of the present disclosure includes: a control unit that determines a period for transmitting a response message, based on at least one of whether received data has a loss and available amount of a reception memory of the reception device; and a communication unit that transmits the response message to the transmission device according to the determined period.

16 Claims, 18 Drawing Sheets

(51) Int. Cl.
*H04L 12/801* (2013.01)
*H04L 12/851* (2013.01)
*H04W 84/12* (2009.01)
*H04W 76/15* (2018.01)

(52) U.S. Cl.
CPC ..... *H04L 47/2408* (2013.01); *H04W 28/0252* (2013.01); *H04W 76/15* (2018.02); *H04W 84/12* (2013.01)

(56) References Cited

U.S. PATENT DOCUMENTS

| | | | |
|---|---|---|---|
| 9,712,374 B1* | 7/2017 | Cao | H04L 29/08072 |
| 2010/0238875 A1* | 9/2010 | Sung | H04L 12/66 |
| | | | 370/329 |

OTHER PUBLICATIONS

IEEE P802.11ac/D5.0, "Draft Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, Amendment 4: Enhancements for Very High Throughput for Operation in Bands Below 6 GHz, Jan. 2013, 440 pgs.

* cited by examiner

APPARATUS AND METHOD FOR CONTROLLING DATA TRANSMISSION SPEED IN WIRELESS COMMUNICATION SYSTEM

CROSS-REFERENCE TO RELATED APPLICATION(S) AND CLAIM OF PRIORITY

The present application is related to and claims the benefit of priority under 35 U.S.C. § 119(a) to Korean Application Serial No. 10-2015-0109067, which was filed in the Korean Intellectual Property Office on Jul. 31, 2015, the entire content of which is hereby incorporated by reference.

TECHNICAL FIELD

The present disclosure relates to a technology for controlling data transmission speed in a wireless communication system.

BACKGROUND

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a super high frequency (mmWave) band (for example, 60 GHz band) is being considered. Technologies such as beamforming, a massive array multiple-input multiple-output (massive MIMO), a full dimensional multiple-input multiple-output (full dimensional MIMO: FD-MIMO), an array antenna, analog beamforming, and a large scale antenna have been discussed in order to alleviate path loss of a radio wave and increase a transmission distance of a radio wave, in a super high frequency wave band.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and reception interference cancellation have been developed in the 5G communication system, in order to improve the system network.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

When a transmission device transmits data, using a transmission control protocol (TCP) scheme in a wireless communication system, the transmission device may not transmit data having the size equal to or greater than that of an initial congestion window (CWND). Therefore, when data is transmitted using the TCP scheme, data transmission efficiency may be lowered.

SUMMARY

To address the above-discussed deficiencies, it is a primary object of this disclosure to provide an apparatus and method for controlling data transmission speed in order to transmit or receive a data at a maximum speed and minimize a communication standby delay of the transmission device.

Various embodiments of the present disclosure are to provide an apparatus and method for improving the speed of an uplink transmission control protocol (TCP), based on wireless connection network information.

Various embodiments of the present disclosure are to provide an apparatus and method for improving a user's satisfaction level through a differentiated speed by considering a weight value of the quality of service (QoS) of an application of each of uplink transmission control protocols.

A transmission device in a wireless communication system according to an embodiment of the present disclosure includes a processor, and a memory electrically connected to the processor, wherein the memory stores instructions configured to allow the processor, at the time of execution, to determine the maximum size of data that can be transmitted in each transmission unit, based on network information, determine transmission speeds of multiple transmission control protocol (TCP) connections, based on the maximum size of data, respectively, and transmit data through each of the multiple TCP connections to a reception device.

A reception device in a wireless communication system according to an embodiment of the present disclosure includes a processor, and a memory electrically connected to the processor, wherein the memory stores instructions configured to allow the processor, at the time of execution, to determine a period for transmitting a response message, based on at least one of whether a received packet has a loss and whether a reception memory is insufficient, and transmit the response message to a transmission device according to the determined period.

An operation method by a transmission device in a wireless communication system according to an embodiment of the present disclosure includes: determining the maximum size of data that can be transmitted in each transmission unit, based on network information; determining transmission speeds of multiple transmission control protocol connections, based on the maximum size of data that can be transmitted, respectively; and transmitting data through each of the multiple TCP connections to a reception device.

An operation method by a reception device of a wireless communication system according to an embodiment of the present disclosure includes: determining a period for transmitting a response message, based on at least one of whether received data has a loss and whether a reception memory is insufficient, and transmitting the response message to a transmission device according to the determined period.

A transmission device in a wireless communication system according to an embodiment of the present disclosure includes: a control unit that determines the maximum size of data that can be transmitted in each transmit unit, based on network information, and determines transmission speeds of multiple transmission control protocol connections, based on the size of data that can be transmitted, respectively; and a communication unit that transmits data through each of the multiple TCP connections to a reception device.

A reception device of a wireless communication system according to an embodiment of the present disclosure includes a control unit that determines a period for transmitting a response message, based on at least one of whether received data has a loss and whether a reception memory is insufficient, and a communication unit that transmits the response message to a transmission device according to the determined period.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the operational principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, the present disclosure provides a description with respect to a technology for controlling a transmission speed in a wireless communication system.

Figure 1:
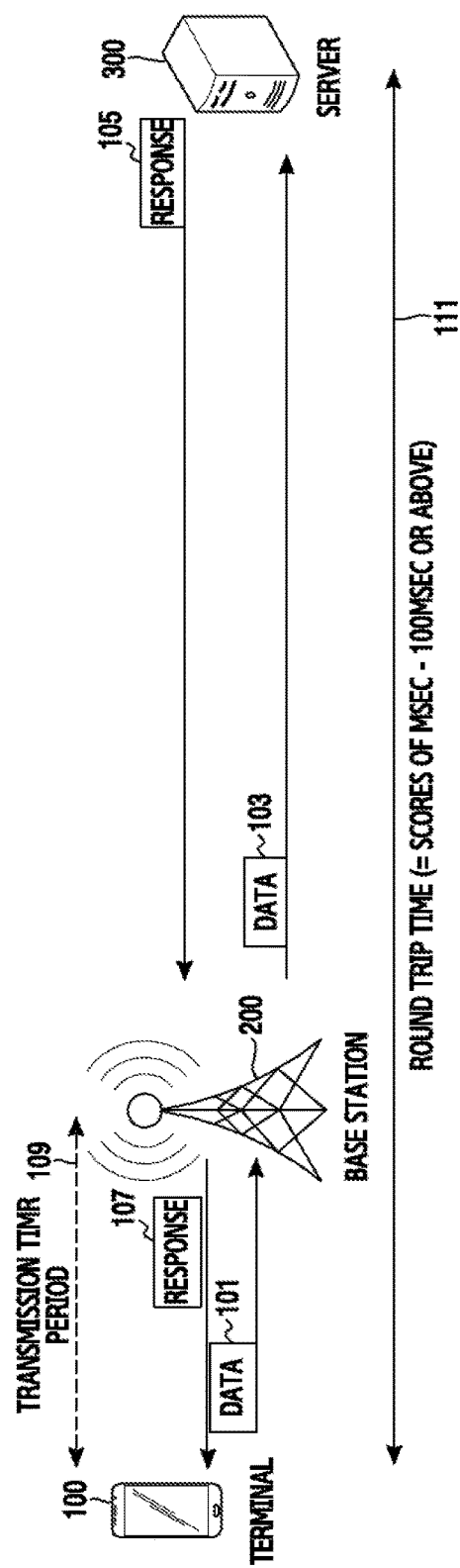
FIG. 1 illustrates an environment of a wireless communication system according to an embodiment of the present disclosure.

FIG. 1 illustrates an environment of a wireless communication system according to an embodiment of the present disclosure.

Referring to FIG. 1, the wireless communication system according to an embodiment of the present disclosure includes a terminal 100, a base station 200, and a server 300.

The terminal 100 is an electronic device including a function for enabling communication with the base station 200. For example, the terminal 100 may be one of a smart phone, a portable terminal, a mobile phone, a mobile pad, a media player, a tablet computer, a handheld computer, a personal digital assistant (PDA), a wireless controller, and a wearable device. Further, the terminal 100 may be a device having a combination of two or more functions among functions of the described devices.

The base station 200 is an electronic device including a function for enabling communication with the terminal 100. The base station 200 may be referred to as an eNB, or an eNodeB or an access point (AP). For example, the base station 200 may be the eNB or the eNodeB when data is transmitted or received to and from the terminal 100 through a mobile communication network. In addition, the base station 200 may be the access point when data is transmitted or received to and from the terminal 100 through a wireless local area network (LAN)

A communication connection between the terminal 100 and the base station 200 may be performed based on at least one of Bluetooth, Bluetooth low energy (BLE), near field communication (NFC), wireless fidelity (Wi-Fi), wireless gigabit (WiGig), ZiGbee, ultra-wideband (UWB), infrared data association (IrDA), visible light communication (VLC), global system for mobile communication (GSM), enhanced data GSM environment (EDGE), code division multiple access (CDMA), and long term evolution (LTE).

The server 300 means a communication device for providing a service to at least one terminal in a communication network. The server 300 performs a communication with the base station 200 through an Internet network 213.

The terminal 100 transmits or receives data to and from the base station 200. The terminal 100 transmits 101 data to the base station 200, using a transmission control protocol scheme. The terminal 100 may receive 107 a response (acknowledge, ACK) transmitted by the server, after transmitting data 103 to the base station 200, through the transmission control protocol scheme. The terminal 100 controls a congestion window (CWND), i.e., a transmission speed of the transmission control protocol, after receiving 107 TCP ACK through the base station 200. In addition, the terminal 100 may operate a transmission window slide (send window slide) that notifies of whether a data packet can be transmitted. Therefore, the terminal 100 may not control the CWND before the TCP ACK is received. Further, the terminal 100 may not transmit the data packet before the TCP ACK is received.

Along with the development of a wireless technology, the speed of transmitting or receiving data through a wireless network has been increased. Accordingly, a CWND control scheme of TCP may not be proper for an increasing data transmission or reception speed. For example, the terminal 100, in an LTE environment, may have a greater amount of data that can be transmitted in a unit transmission time interval (TTI) 109 than an initial CWND, in an uplink.

The terminal 100, in the TCP scheme, does not transmit data having a value equal to or greater than an initial CWND during a packet round trip time (RTT) 111 until the TCP ACK is received from the base station 200. In other words, the terminal 100 may not transmit data having a value equal to or greater than an initial CWND until the data is transmitted 101 to the base station 200, the base station 200 transmits the data 103 to the server 300, the base station 200 receives a response 105 from the server 300, and then the terminal 100 receives 107 the response from the base station 200.

That is, although data may be transmitted in a wireless network, the terminal 100 does not transmit data during approximately 10 to 100 times of transmission time intervals RTT/TTI due to a restriction of the TCP CWND.

More overhead may occur in an MAC layer necessary for transmitting or receiving data such as a TCP packet in a case where the terminal 100 uses the wireless LAN than in a case where the terminal 100 uses the cellular network. For example, the terminal 100, in the wireless LAN, needs an MAC control frame such as a request to send (RTS), clear to send (CTS), a block ACK request (BAR), and block ACK (BA), a frame interval such as a short inter-frame space (SIFS) and a distributed inter-frame space (DIFS), and an overhead of an MAC layer including a back-off time, in order to transmit a single data frame. However, the size of an overhead of the MAC layer is fixed whereas a maximum aggregation size, i.e., the size of a data frame, is variable. Therefore, the proportion of the overhead in the MAC layer may be inversely proportional to the maximum aggregation size. That is, in order to reduce the proportion of the overhead in the MAC layer per data, it is required that the terminal 100 enlarges the size of the data frame as large as possible. However, since the terminal 100, due to a low TCP CWND, does not transmit TCP data, using the wireless LAN, the terminal 100 may not transmit a data frame having a large capacity in the wireless LAN. Therefore, the overall data transmission or reception efficiency of the wireless LAN to which the terminal 100 belongs may be lowered.

Figure 2:
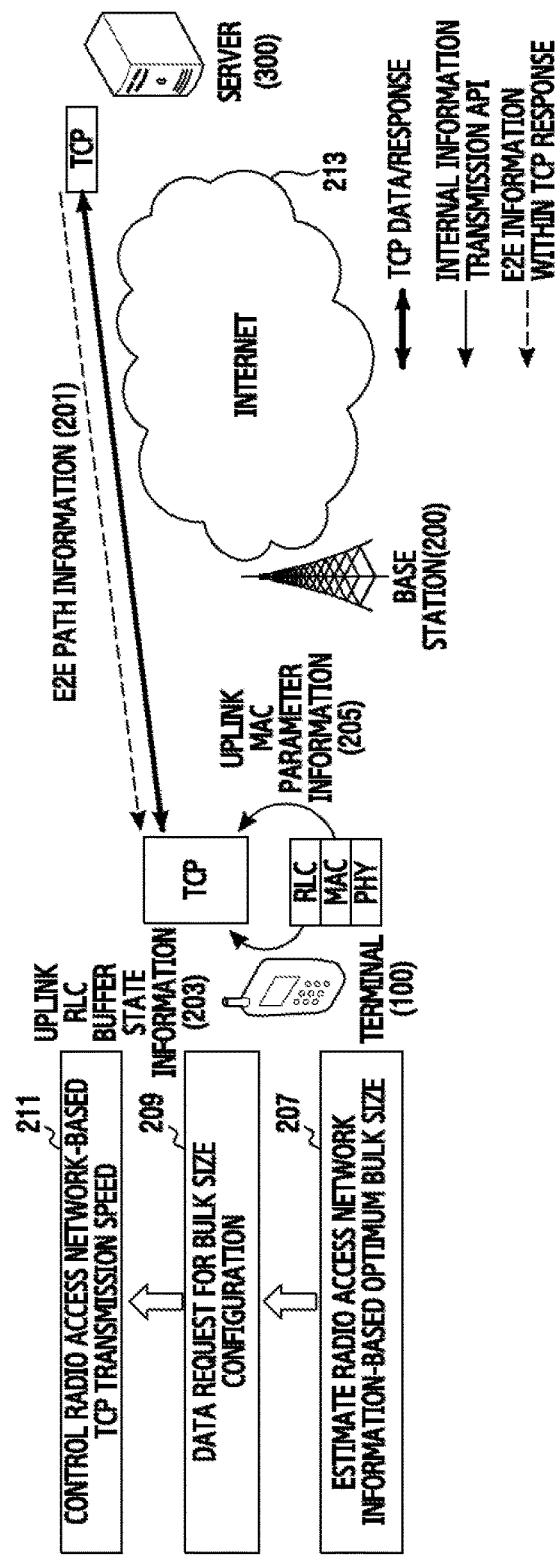
FIG. 2 illustrates an operation by a terminal in a wireless communication system according to an embodiment of the present disclosure.

FIG. 2 illustrates an operation by a terminal in a wireless communication system according to an embodiment of the present disclosure.

Referring to FIG. 2, the terminal 100 according to an embodiment of the present disclosure may receive, from the server 300, end-to-end (E2E) path-related information 201 through the base station 200. The terminal 100 determines uplink MAC parameter information 305 and uplink radio link control (RLC) buffer status information 203 of the terminal 100. The terminal 100 determines 207 the size of bulk, based on information relating to a radio access network, i.e., the RLC buffer status information 203 or the MAC parameter information 205.

The terminal 100 may request 209 data for configuring a determined bulk size. The terminal 100 controls 211 a TCP transmission speed, based on information relating to the radio access network. For example, the terminal 100 controls a TCP CWND, based on the determined bulk size. The terminal 100 may increase a transmission or reception speed of data, by controlling the TCP CWND. For example, the terminal 100 determines the size of the bulk, based on uplink buffer information of a radio link control when a cellular network is used. The terminal 100 determines the size of the bulk, based on uplink buffer information of an MAC when a wireless LAN is used. The terminal 100 determines transmission speeds of multiple TCP connections, based on the size of the bulk, respectively.

The terminal 100 determines an optimum bulk size, which can be used by the terminal 100 in an operating system in which a TCP is located. The terminal 100 determines CWNDs of multiple connections, based on the determined bulk size, respectively. In other words, the terminal 100 determines transmission speeds of the multiple TCP connections, based on the determined bulk size, respectively, and determines the sizes of data transmitted by the multiple TCP connections, respectively.

The terminal 100, in a wireless network, transmits data through an uplink at a maximum transmission speed which enables transmission through the wireless network in an initial state of a TCP connection. In addition, the terminal 100 may minimize a standby delay time in a transmission buffer of the terminal 100.

Figure 3:
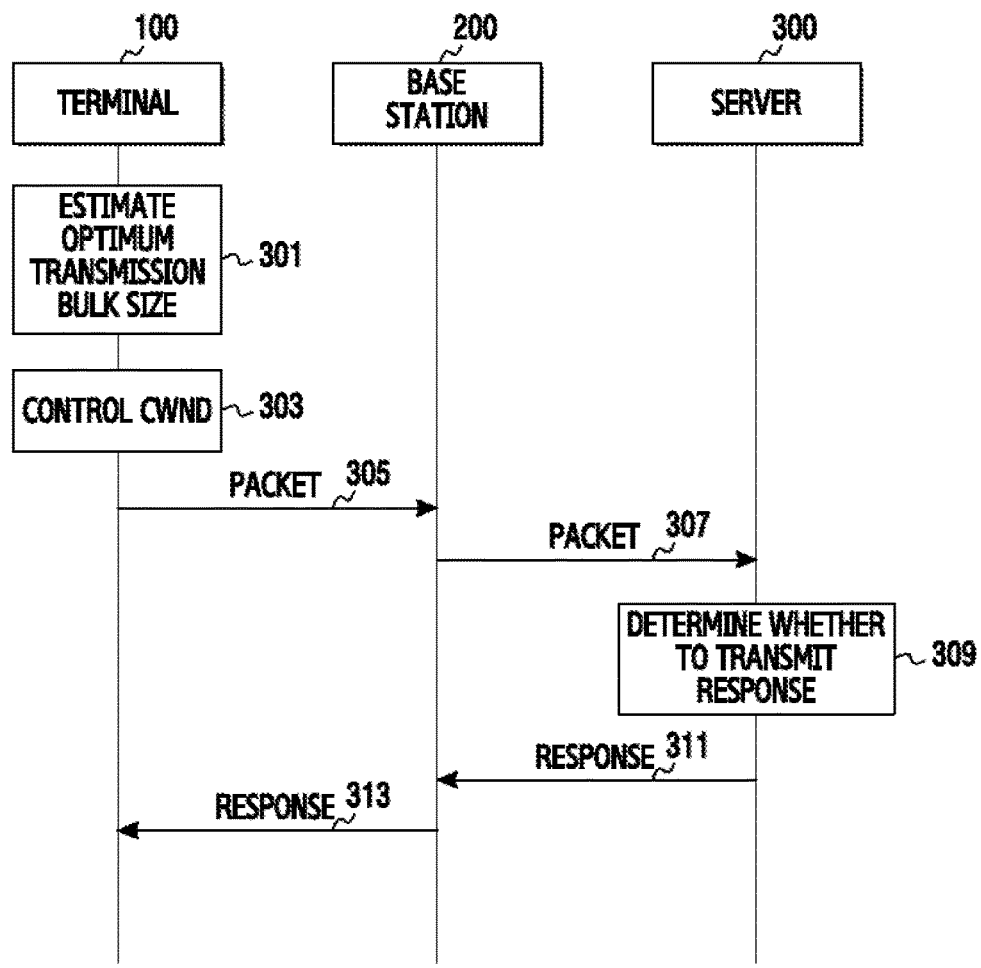
FIG. 3 is a signal flow diagram among a terminal, a base station, and a server, in a wireless communication system according to an embodiment of the present disclosure.

FIG. 3 is a signal flow diagram among a terminal, a base station, and a server, in a wireless communication system according to an embodiment of the present disclosure.

Referring to FIG. 3, the terminal 100 may estimate 301 an optimum transmission bulk size. For example, the terminal 100 determines the transmission bulk size, based on wireless network information.

The terminal 100 controls 303 a CWND of a TCP connection of the terminal 100, based on the determined transmission bulk size. That is, the terminal 100 determines a transmission speed of the TCP connection. According to an embodiment of the present disclosure, the terminal 100 controls CWNDs with respect to multiple TCP connections of the terminal 100, respectively.

The terminal 100 transmits 305 a packet to the base station 200 through TCP connection in which the transmission speed has been determined. The base station 200 may receive a packet from the terminal 100, and then transmits 307 the packet to the server 300.

The server 300 determines 309 whether or not to transmit a response to the base station 200, based on the received packet. For example, the server 300 determines whether or not to transmit the response, based on at least one of information relating to a lost packet and information relating to a reception memory of the server 300.

The server 300 transmits 311 a response to the base station 200 according to a result of the determination. The base station 200 transmits 313 the response to the terminal 100.

Figure 4:
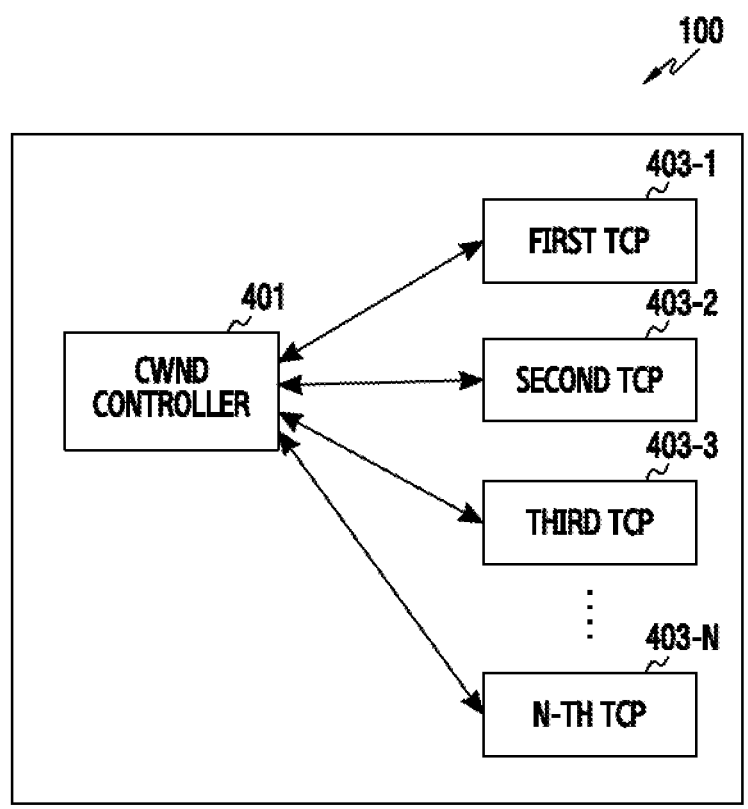
FIG. 4 illustrates an operation for controlling, by a terminal, congestion windows (CWNDs) of multiple transmission control protocols (TCPs) in a wireless communication system according to an embodiment of the present disclosure, respectively.

FIG. 4 illustrates an operation for controlling, by a terminal, CWNDs of multiple TCPs in a wireless communication system according to an embodiment of the present disclosure, respectively.

Referring to FIG. 4, the terminal 100 determines the size of transmission bulk, based on network information. The terminal 100 controls, through a CWND controller 401, CWNDs of multiple TCP connections 403-1 to 403-N, based on the determined transmission bulk size, respectively. For example, the terminal 100 controls each of the CWNDs, based on at least one of weight value information of a service used by each of the TCP connections 403-1 to 403-N and data transmission amount.

Figure 5:
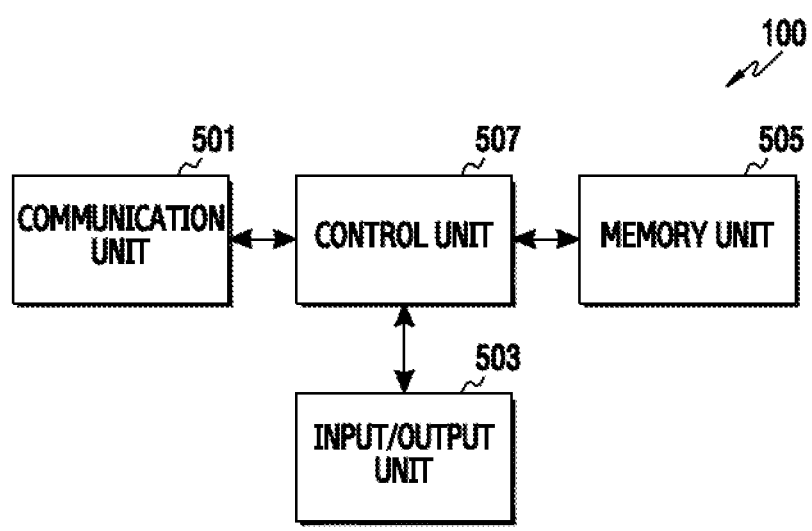
FIG. 5 is a block configuration diagram of a terminal in a wireless communication system according to an embodiment of the present disclosure.

FIG. 5 is a block configuration diagram of a terminal in a wireless communication system according to an embodiment of the present disclosure.

Referring to FIG. 5, the terminal 100 includes a communication unit 501, an input/output unit 503, a memory unit 505, and a control unit 507.

The communication unit 501 performs a function for transmitting or receiving a wireless signal of data that is input or output through an antenna. For example, in case of transmission, the communication unit 501 performs a function for channel-coding data, and then RF processing the channel-coded data to transmit the same. Further, in case of reception, the communication unit 501 performs a function for converting a received RF signal to a base band signal, and channel-decoding the base band signal to restore the data.

According to an embodiment of the present disclosure, the communication unit 501 transmits or receives data to the base station 200 through each of multiple transmission control protocol connections. The communication unit 501 includes a first communication module for communication with a mobile communication network, and a second communication module for communication with a wireless LAN.

The input/output unit 503 includes at least one of a touch screen that provides an input/output interface between the electronic device and a user, a sound output unit that outputs a sound signal, and a print unit that outputs a document or an object. In addition, the input/output unit 503 may be divided into the touch screen, the sound output unit, and the print unit. The input/output unit 503 may provide an interface for a touch input/output by the user. To be more specific, the input/output unit 503 may be a mediator that transmits the user's touch input to the electronic device and shows an output from the electronic device to the user. Further, the input/output unit 503 may provide a visual output to the user. For example, an image of equipment recognized by a camera of the electronic device may be output. Such a visual output appears in the form of a text, a graphic, a video, or a combination thereof. The input/output unit 503 uses various display technologies. For example, liquid crystal display (LCD), light emitting diode (LED), light emitting polymer display (LPD), organic light emitting diode (OLED), active matrix organic light emitting diode (AMOLED), or flexible led (FLED) may be used. The touch screen of the input/output unit 503 of the present disclosure is not limited to a touch screen using a display technology. The input/output unit 503 may be divided into each of a screen output unit and an input unit.

The input/output unit 503 according to an embodiment of the present disclosure displays a user interface for receiving an input of weight value information with respect to at least one service.

The memory unit 505 stores a micro code of a program for a process and control of the control unit 507, and various kinds of reference data.

According to an embodiment of the present disclosure, the memory unit 505 stores network information including information relating to at least one of a measured buffer size, a buffer status report, a modulation and coding scheme, an allocated resource block, and a radio link control buffer size when the communication unit 501 transmits data through the first communication module for communication with a mobile communication network. The memory unit 505 stores information relating to at least one of a maximum aggregation size and a media access control (MAC) buffer size when the communication unit 501 transmits the data through the second communication module for communication with a wireless LAN.

The control unit 507 controls an overall operation of the control device. For example, the control unit 507 performs a process and control for sound communication and data communication.

According to an embodiment of the present disclosure, the control unit 507 determines a maximum size of data that can be transmitted, based on network information, and determine transmission speeds of multiple TCP connections, based on the size of the data that can be transmitted, respectively. The control unit 507 determines transmission spends of the multiple TCP connections, based on at least one of the number of the multiple TCP connections, weight value information of a service used by each of the multiple TCP connections, and the amount of data transmission used by each of the multiple TCP connections, respectively. The control unit 507 may distribute, to each of the multiple TCP connections, the determined maximum size of data that can be transmitted, so as to determine transmission speeds of the multiple TCP connections, respectively.

Figure 6:
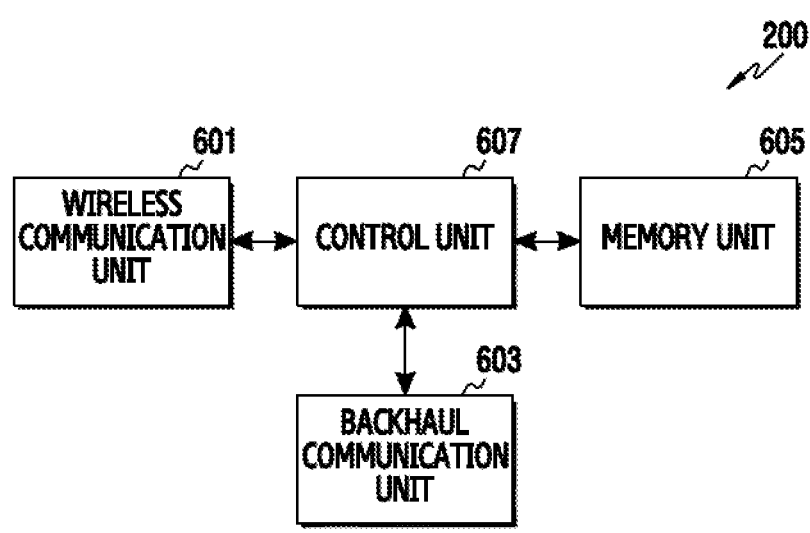
FIG. 6 is a block configuration diagram of a base station in a wireless communication system according to an embodiment of the present disclosure.

FIG. 6 is a block configuration diagram of a base station in a wireless communication system according to an embodiment of the present disclosure.

Referring to FIG. 6, the base station 200 includes a wireless communication unit 601, a backhaul communication unit 603, a memory unit 605, and a control unit 607.

The wireless communication unit 601 includes an RF processing unit (not shown) and a base band processing unit (not shown). The RF processing unit (not shown) performs a function for transmitting or receiving a signal through a wireless channel such as band conversion and amplification of a signal. That is, the RF processing unit (not shown) uplink converts a base band signal provided by the base band processing unit (not shown) to an RF band signal and then transmits the same through an antenna, and downlink-converts the RF band signal received through the antenna to a base band signal. For example, the RF processing unit (not shown) includes a transmission filter, a reception filter, an amplifier, a mixer, an oscillator, a DAC, an ADC, and the like. The base station 200 includes multiple antennas. In addition, the RF processing unit (not shown) includes multiple RF chains. Further, the RF processing unit (not shown) performs beamforming. For the beamforming, the RF processing unit (not shown) may adjust phases and sizes of signals transmitted or received through multiple antennas or antenna elements.

The base band processing unit (not shown) performs conversion between a base band signal and a bit string according to the physical layer standard of a system. For example, when transmitting data, the base band processing unit (not shown) generates complex symbols by coding and modulating a transmission bit string. In addition, the base band processing unit (not shown), when receiving data, restores a reception bit string through demodulation and decoding of a base band signal provided by the RF processing unit (not shown). For example, in case of following an OFDM scheme, the base band processing unit (not shown), when transmitting data, generates complex symbols by coding and modulating a transmission bit string, maps the complex symbols to subcarriers, and then configures OFDM symbols through IFFT calculation and CP insertion. In addition, the base band processing unit (not shown), when receiving data, divides a base band signal provided by the RF processing unit (not shown) in units of OFDM symbols, restores signals mapped to subcarriers through FFT calculation, and then restores a received bit string through demodulation and decoding. The base band processing unit (not shown) and the RF processing unit (not shown) transmit and receive signals as described above. Accordingly, the base band processing unit (not shown) and the RF processing unit (not shown) may be referred to as a transmission unit, a reception unit, a transceiver unit, or a communication unit.

According to an embodiment of the present disclosure, the wireless communication unit 601 may receive data from the terminal 100. In addition, the wireless communication unit 601 transmits, to the terminal 100, a response message transmitted by the server 300.

The backhaul communication unit 603 provides an interface for performing communication with other nodes within a network. That is, the backhaul communication unit 603 converts a bit string transmitted by the base station 200 to another node, for example, another base station, a core network, etc., into a physical signal and converts a physical signal received from the another node into a bit string.

According to an embodiment of the present disclosure, the backhaul communication unit 603 may receive, from the server 300, a response message transmitted by the server 300 to the terminal 100.

The memory unit 605 stores data such as a basic program, application program, and configuration information for an operation of the base station 200. The memory unit 605 provides the stored data according to a request of the control unit 607.

The control unit 607 controls overall operations of the base station 200. For example, the control unit 607 transmits or receives a signal through the wireless communication unit 601 or the backhaul communication unit 603. In addition, the control unit 607 records data in the memory 605 and reads the same. To this end, the control unit 607 includes at least one processor.

Figure 7:
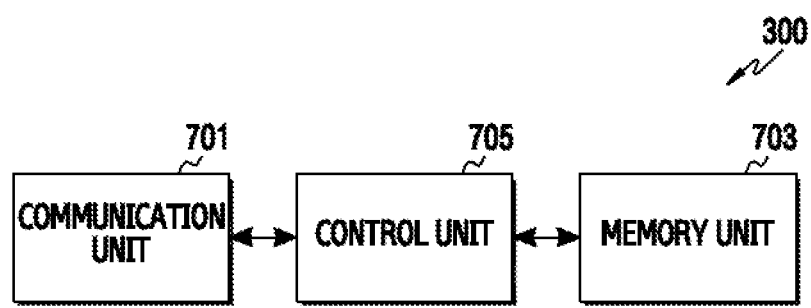
FIG. 7 is a block configuration diagram of a server in a wireless communication system according to an embodiment of the present disclosure.

FIG. 7 is a block configuration diagram of a server in a wireless communication system according to an embodiment of the present disclosure.

Referring to FIG. 7, the server 300 includes a communication unit 701, a memory unit 703, and a control unit 705.

The communication unit 701 provides an interface for performing communication with other nodes within a network. That is, the communication unit 701 converts a bit string transmitted by the server 300 to another node, for example, a base station, a core network, etc., into a physical signal and converts a physical signal received from the another node into a bit string.

The communication unit 701 according to an embodiment of the present disclosure transmits a response message to the base station 200 according to a period determined in order to transmit the response message, based on at least one of whether received data has a loss and whether a reception memory is insufficient.

The memory unit 703 stores data such as a basic program, application program, and configuration information for an operation of the server 300. The memory unit 703 provides the stored data according to a request of the control unit 705.

According to another embodiment of the present disclosure, the memory unit 703 stores a response message including at least one of information relating to a lost packet and information relating to a reception memory.

The control unit 705 controls overall operations of the server 300. For example, the control unit 705 transmits or receives a signal through the communication unit 701. In addition, the control unit 705 records data in the memory unit 703, and reads the same. To this end, the control unit 705 includes at least one processor.

According to an embodiment of the present disclosure, the control unit 705 determines a period for transmitting a response message, based on at least one of whether received data has a loss and whether a reception memory is insufficient.

Figure 8:
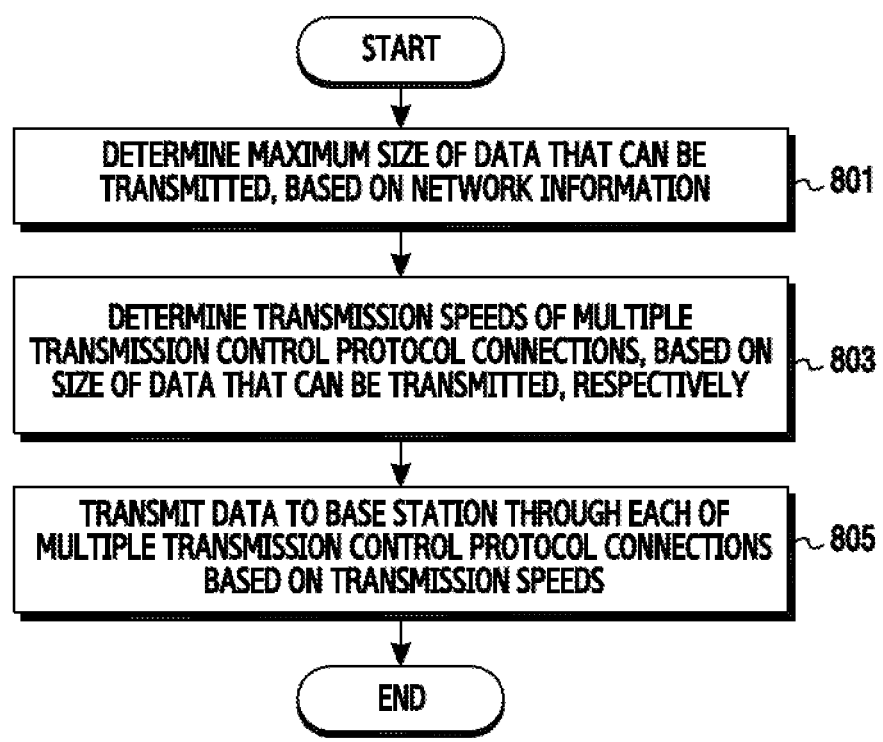
FIG. 8 is an operation flow chart of a terminal in a wireless communication system according to an embodiment of the present disclosure.

FIG. 8 is an operation flow chart of a terminal in a wireless communication system according to an embodiment of the present disclosure.

Referring to FIG. 8, the terminal 100 determines a maximum size of data that can be transmitted, based on network information, in step 801. The network information includes information relating to at least one of a measured buffer size, a buffer status report, a modulation and coding scheme, an allocated resource block, and a radio link control buffer size when the communication unit of the terminal 100 transmits the data through a first communication module for communication with a mobile communication network. According to another embodiment of the present disclosure, the network information includes information relating to at least one of a maximum aggregation size and an MAC buffer size when the communication unit of the terminal 100 transmits the data through a second communication module for communication with a wireless LAN.

The terminal 100 determines transmission speeds of multiple TCP connections, based on the size of the data that can be transmitted, respectively. The terminal 100 determines transmission speeds of the multiple TCP connections, based on at least one of the number of the multiple TCP connections, weight value information of a service used by each of the multiple TCP connections, and the amount of data transmission used by each of the multiple TCP connections, respectively. The weight value information includes information relating to at least one of a type of the service, a function of the terminal device, which is used by the service, a bandwidth for the service, and a latency for the service. According to another embodiment of the present disclosure, the weight value information may be determined according to a signal input through a user interface of the terminal 100. The terminal 100 displays the user interface. The terminal 100 may distribute, to each of the multiple TCP connections, the size of the data that can be transmitted, so as to determine transmission speeds of the multiple TCP connections, respectively. The terminal 100 determines a maximum size of the data that can be transmitted, based on a response message received from the base station 200. The response message includes at least one of information relating to a packet lost in the base station 200 and information relating to a reception memory of the base station 200.

The terminal 100 transmits data to the base station through each of the multiple TCP connections, in step 805.

Figure 9:
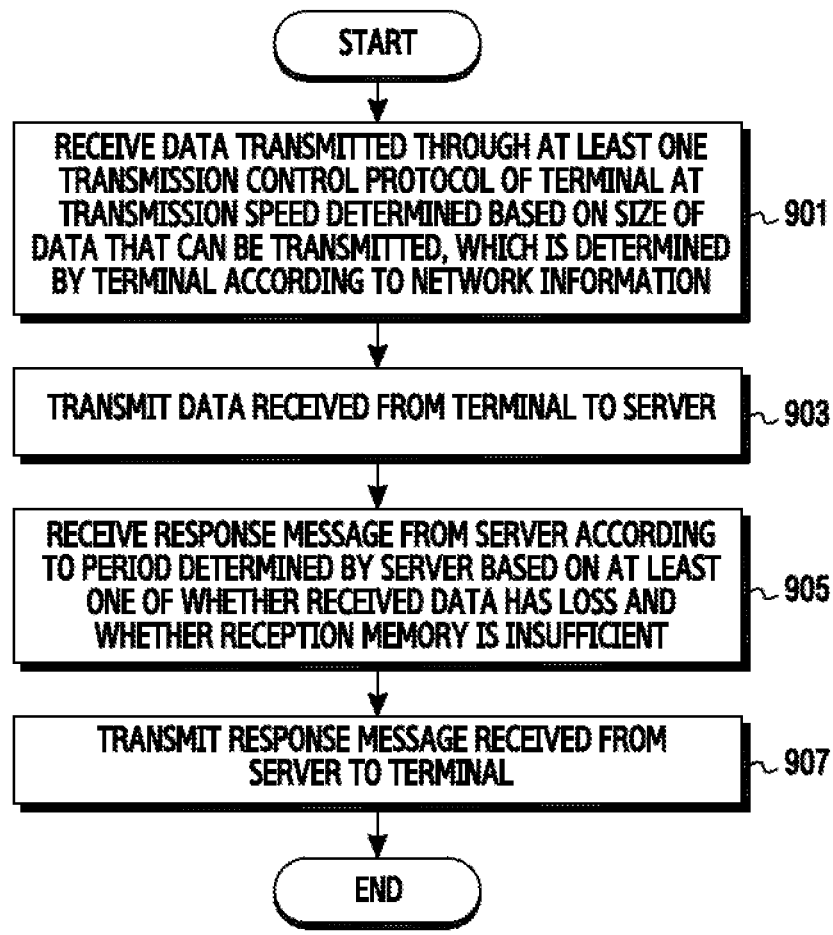
FIG. 9 is an operation flow chart of a base station in a wireless communication system according to an embodiment of the present disclosure.

FIG. 9 is an operation flow chart of a base station in a wireless communication system according to an embodiment of the present disclosure.

Referring to FIG. 9, the base station 200 receives data from the terminal, in step 901. The data may be transmitted through at least one transmission control protocol of the terminal at a transmission speed determined based on the size of data that can be transmitted, which is determined by the terminal according to network information.

The base station 200 transmits, to the server 300, the data received from the terminal 100, in step 903. The base station 200 transmits the data received from the terminal 100 to the server 300.

The base station 200 receives a response message from the server 300, in step 905. The response message may be transmitted by the server 300 according to a period determined based on at least one of whether received data has a loss and whether a reception memory is insufficient.

The terminal 100 transmits, to the terminal, the response message received from the server 300, in step 907.

Figure 10:
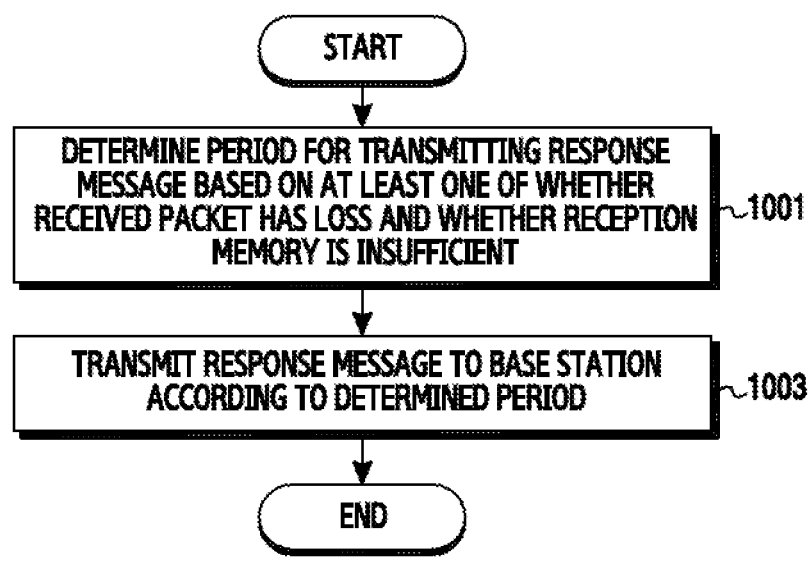
FIG. 10 is an operation flow chart of a server in a wireless communication system according to an embodiment of the present disclosure.

FIG. 10 is an operation flow chart of a server in a wireless communication system according to an embodiment of the present disclosure.

Referring to FIG. 10, the server 300 determines a period for transmitting a response message, based on at least one of whether a received packet has a loss and whether a reception memory is insufficient, in step 1001.

The server 300 transmits, to the base station 200, the response message according to the determined period, in step 1003. The response message includes at least one of information relating to a lost packet and information relating to the reception memory.

Figure 11:
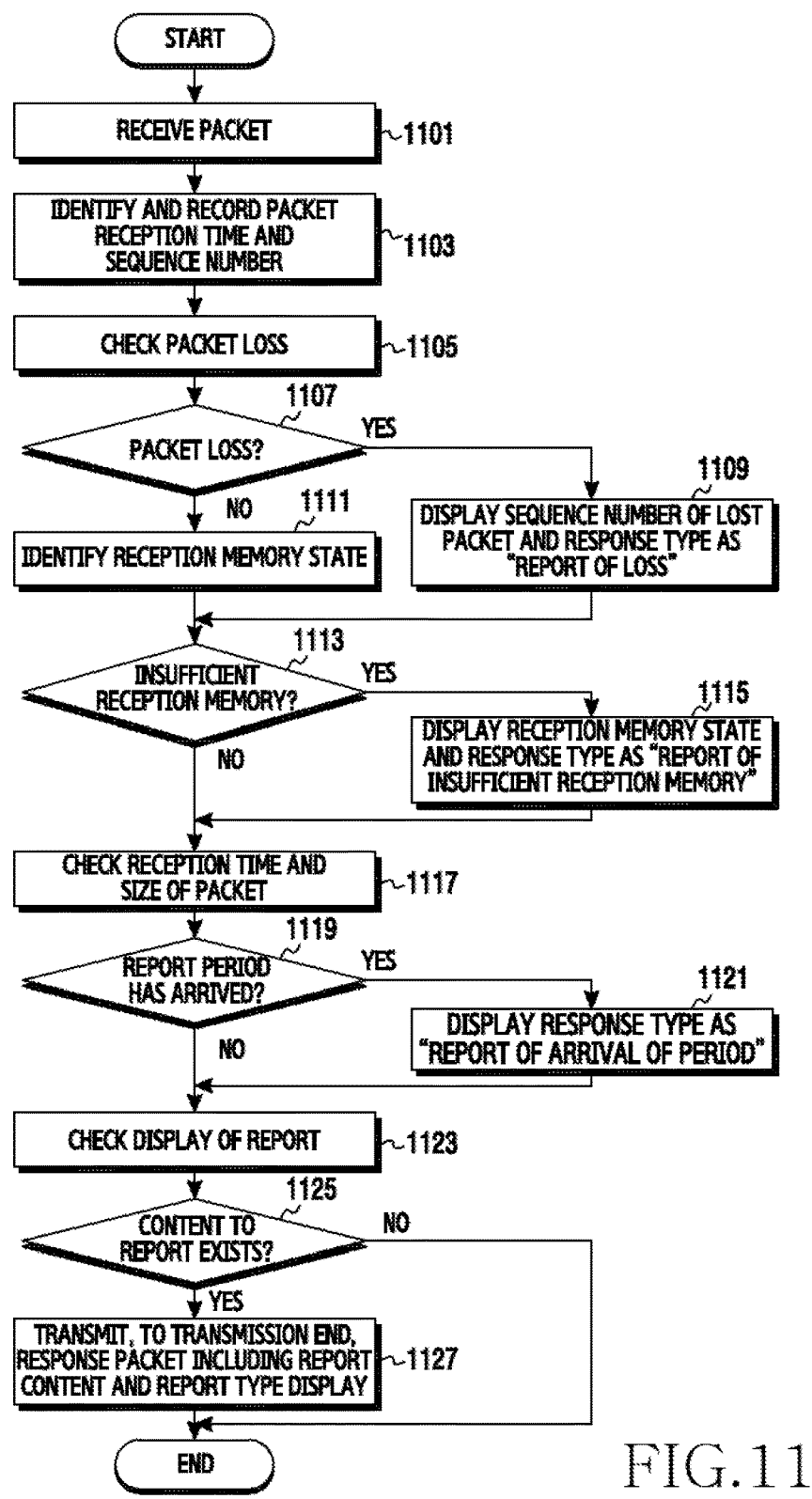
FIG. 11 is an operation flow chart of a server in a wireless communication system according to another embodiment of the present disclosure.

FIG. 11 is an operation flow chart of a server in a wireless communication system according to another embodiment of the present disclosure.

Referring to FIG. 11, the server 300 receives a packet from the base station 200, in step 1101.

The server 300 identifies a time when the packet is received and a sequence number of the packet, in step 1103.

The server 300 checks a lost packet at the time of receiving the packet, in step 1105. The server 300 may check the lost packet, based on the sequence number of the packet.

The server 300 determines whether a packet loss has occurred, in step 1107.

The server 300, when the packet loss has occurred, may proceed to step 1109, include a sequence number of the lost packet in a response packet for notifying of occurrence of the packet loss, and display a type of the response message as "report of a loss". For example, the server 300 includes the sequence number of the lost packet in an internal variable of the response packet.

The server 300, when the packet loss has not occurred, proceeds to step 1111 to check a reception memory state of the server 300. The server 300 determines whether the reception memory is insufficient, in step 1113.

The server 300, when the reception memory is insufficient, proceeds to step 1115, and includes, in the response packet, information for notifying of insufficiency of the reception memory. The server 300, when the reception memory is insufficient, includes, in the response packet, information for requesting to decrease transmission speed from the terminal 100. The server 300 displays a type of the response packet as "report of an insufficient reception memory".

When the reception memory is not insufficient or configuration for the response packet including information for notifying of insufficiency of the reception memory is terminated, the server 300 proceeds to step 1117 and checks a time when the packet has been received and the size of the packet. The server 300 may compare a time when the packet has been received and the size of data having been received as of the current time with a time when a latest report has occurred and the size of data having been received as of the time of the latest report. The server 300 includes a result of the comparison in the response packet for a periodic report.

The server 300 determines whether a report period has arrived, in step 1119. The server 300 determines whether the report period has arrived, based on whether the packet has a loss and whether the reception memory is insufficient.

The server 300, when the report period has arrived, may proceed to step 1121 and display a response type as "report of arrival of a period" in the response packet for a periodic report. The server 300 includes, in the response packet for a periodic report, a time when the latest report has occurred and the amount of data having been received as of the time of the latest report, and a time when the current data packet has been received.

The server 300 proceeds to step 1123 to check indication displayed in the response packet for a periodic report.

The server 300 determines whether a content to report exists, in step 1125. The server 300 terminates generating the response packet when a content to report does not exist.

The server 300, when a content to report exists, transmits the response packet including the content to report and a report type to the base station or an access point 200, in step 1127.

According to an embodiment of the present disclosure, the response packet includes information like TABLE 1 below.

TABLE 1

| Type | Length | Value |
|---|---|---|
| Time periodic response | 2bite | Latest reporting time, Sequence number of latest report |
| Non-time periodic response | 2bite | Latest reporting time, Sequence number of latest report |
| Negative response | Variable (determined | Lost packet number, Lost packet sequence |

TABLE 1-continued

| Type | Length | Value |
| --- | --- | --- |
| | according to lost packet) | number |
| Buffer status response of server | 1bite | Buffer size of server (8bit) |

Figure 12:
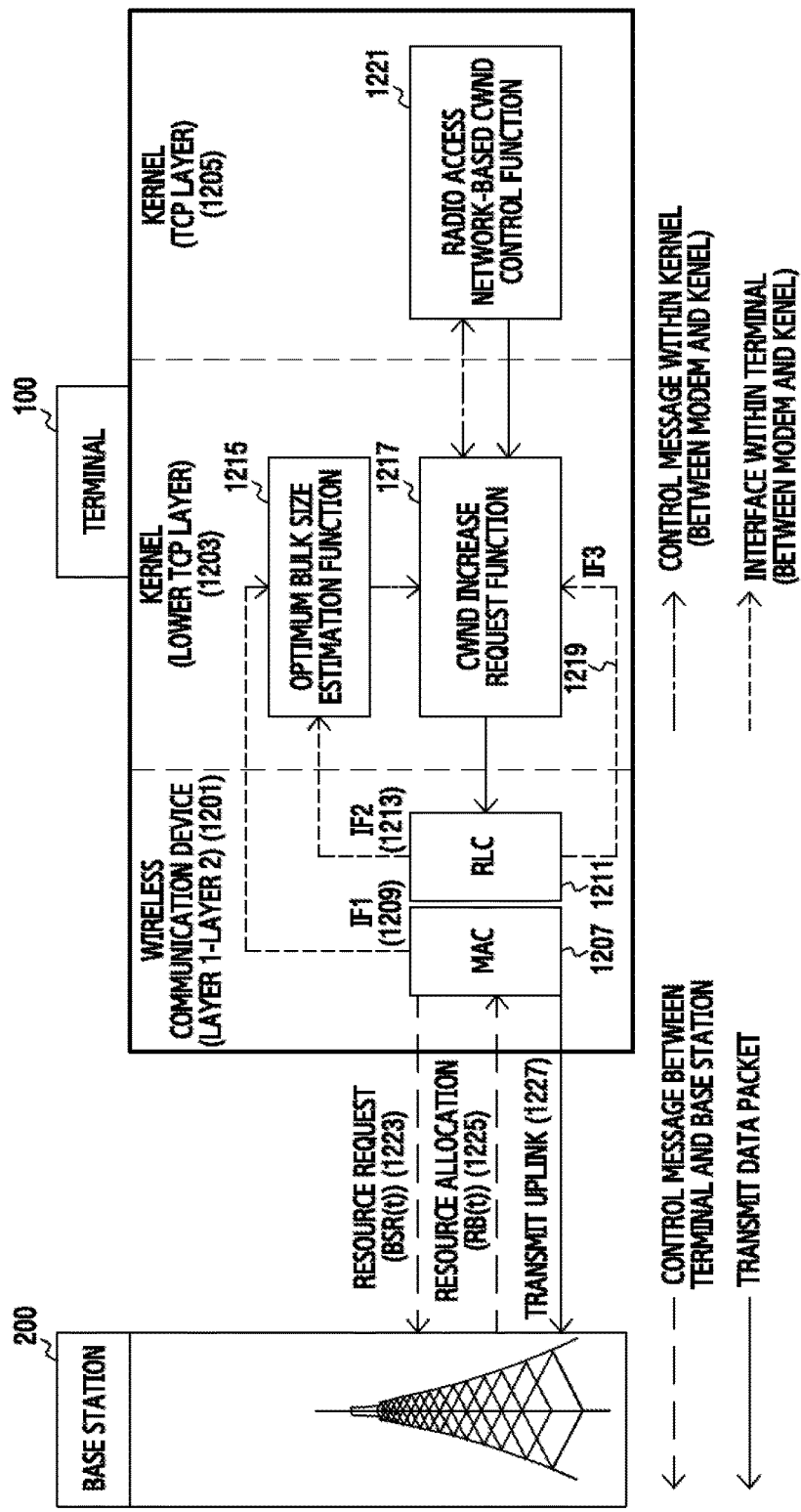
FIG. 12 illustrates an operation by a terminal in order to control a data transmission speed in a wireless communication system according to an embodiment of the present disclosure.

FIG. 12 illustrates an operation by a terminal in order to control a data transmission speed in a wireless communication system according to an embodiment of the present disclosure.

Referring to FIG. 12, the terminal 100 includes a wireless communication device 1201, a lower TCP layer of a kernel 1203, and a TCP layer of a kernel 1205. The terminal 100 determines information relating to a radio access network through the wireless communication device 1201. The terminal 100 determines information relating to the radio access network through a first layer and second layer included in the radio access network 1221. For example, the terminal 100 determines information relating to an MAC transmission buffer through an MAC layer 1207. In addition, the terminal 100 determines information relating to an RLC transmission buffer through an RLC layer 1211.

The terminal 100 transmits information relating to the MAC transmission buffer to the lower TCP layer 1203 through a first interface 1209. In addition, the terminal 100 transmits information relating to the RLC transmission buffer to the lower TCP layer 1203 through a second interface 1213. The terminal 100 determines 1215 the size of transmission bulk, based on radio access network information received from the wireless communication device 1201 in the lower TCP layer 1203. The terminal 100 controls 1217 a TCP CWND increase request function, based on the determined size of transmission bulk. For example, the terminal 100 determines CWNDs of multiple TCP connections, in the TCP layer 1205, based on the size of the transmission bulk, respectively. A third interface 1219 links from the RLC transmission butter to the TCP CWND increase request function of the lower TCP layer 1203.

The terminal 100 may request 1223 a resource from the base station 200, based on the determined CWND. The base station 200 may allocate 1225 a resource to the terminal 100. The terminal 100 transmits 1227 data to the base station 200 through the resource allocated by the base station 200.

Figure 13:
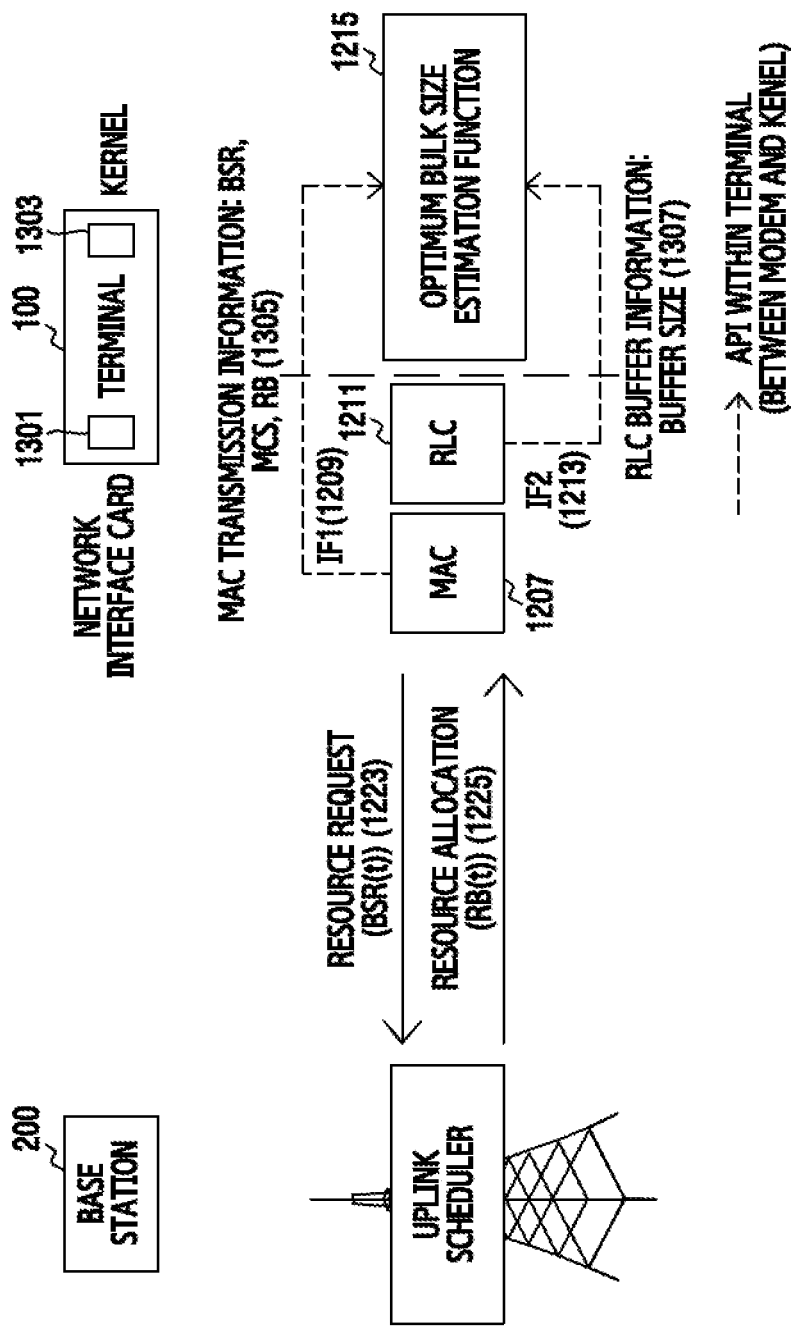
FIG. 13 illustrates an operation for determining, by a terminal, transmission bulk in a wireless communication system according to an embodiment of the present disclosure.

FIG. 13 illustrates an operation for determining, by a terminal, transmission bulk in a wireless communication system according to an embodiment of the present disclosure.

Referring to FIG. 13, the terminal 100 includes a network interface card 1301, and a kernel 1303. The terminal 100, when using a wireless LAN, determines 1215 an optimum bulk size, based on MAC transmission information 1305. For example, the terminal 100 transmits, to the kernel 1303, MAC transmission information 1305 of the MAC layer 1207 through the first interface 1209 of the network interface card 1301. The MAC transmission information 1305 is a maximum aggregation size, i.e., a MAC layer parameter. The terminal 100 determines 1215 the optimum bulk size, based on the MAC transmission information 1305 through the kernel 1303.

The terminal 100, when using a cellular network, determines the transmission bulk size, based on RLC buffer information 1307 and the MAC transmission information 1305. For example, the terminal 100 transmits a buffer status report (BSR), a modulation and coding scheme (MCS), and allocated radio resource block (RB), using the first interface from the MAC layer. The terminal 100 transmits the RLC buffer information 1307 to the kernel 1303 through a second interface 1213 from the RLC layer 1211. The RLC buffer information 1307 includes information relating to the size of a transmission buffer.

The terminal 100, when using a cellular network, may identify a maximum buffer status report value from the MAC layer 1207 through the first interface 1209, in an initial transmission time interval in which no transmission record exists. The terminal 100 determines 1215 the size of transmission bulk in the initial transmission time interval, by multiplying the maximum buffer status report value by $\alpha$ that is a configuration parameter between zero and one. For example, the terminal 100 determines 1215 the size of the transmission bulk through EQUATION 1 below.

$$BS(0)=\alpha*MAX.BSR \qquad \text{[EQUATION 1]}$$

BS(0) indicates the size of transmission bulk in the initial transmission time interval, $\alpha$ indicates a configuration parameter between zero and one, and MAX.BSR indicates the maximum buffer status report value.

The terminal 100, when using a wireless LAN, determines a maximum amount of data that can be transmitted, which is the same as the maximum aggregation size from the MAC layer 1207, in an initial transmission time interval in which no transmission record exists.

The terminal 100, in every transmission time interval, determines the size of the transmission bulk, based on a buffer status report value requested by the terminal 100 from the base station 200, and the size of a resource block allocated by the base station 200. For example, the terminal 100 may check the amount of data which the terminal 100 intends to transmit in a previous transmission time interval, based on a buffer status report value of the previous transmission time interval, a modulation and coding scheme value, and a resource block value. The terminal 100 may calculate an error in the amount of data that can be transmitted, according to the amount of the data and the size of a resource block allocated by the base station 100. The terminal 100 determines an optimum bulk size which can be transmitted in the current transmission time interval, based on the error. That is, the terminal 100 may reduce the size of the transmission bulk when the amount of data that can be transmitted according to the size of a resource block allocated by the base station 200 is smaller than the amount of data transmitted in the previous transmission time interval. In addition, the terminal 100 may increase the size of the transmission bulk when the amount of data that can be transmitted according to the size of a resource block allocated by the base station 200 is larger than the amount of data transmitted in the previous transmission time interval.

For example, the terminal 100 determines the size of the transmission bulk through EQUATION 2 below.

$$\text{if}(f(MCS,RB)<BSR(r),$$

$$BS(t+1)=(1-\gamma)*BS(t)\pm(\gamma)*[BS(t)-BSR(t)-f(MCS,RB)]$$

$$\text{if}(f(MCS,RB)>\varepsilon*BSR(r),$$

$$BS(t+1)=(1-\gamma)*BS(t)+(\gamma)*[\beta*BS(t)] \qquad \text{[EQUATION 2]}$$

MCS indicates a modulation and coding scheme value, RB indicates a value of a resource block allocated by the base station, f(MCS, RB) indicates the amount of transmission data allocated by the base station, and BSR(r) indicates the amount of data intended to be transmitted in transmission time interval r. BS(r) indicates the size of bulk in time r.

In addition, the terminal 100 determines the size of the transmission bulk, based on the amount of change in the size of a buffer of a radio link control of the terminal 100.

For example, the terminal 100 determines an error in the amount of data that can be transmitted according to the amount of data transmitted in a previous transmission time interval and the size of a resource block allocated by the base station 200. The terminal 100 determines 1215 the size of the transmission bulk, based on the error and the amount of change in the amount of data standing by in the radio link control buffer. The terminal 100 determines a radio resource request 1223 from the base station 200, based on the amount of data standing by in the radio link control buffer. That is, the base station 200 may allocate 1225 a resource block to the terminal 100, according to the amount of data standing by in the radio link control buffer. The terminal 100 determines 1215 the size of transmission bulk in the current transmission time interval, based on the amount of data transmitted in a previous transmission time interval and an error in the amount of actually transmitted data.

For example, the terminal 100 determines 1215 the size of the transmission bulk through EQUATION 3 below.

if($RLC_B(t)-RLC_B(t-1)<BSR(t)$), $BS(t+1)=(1-\gamma)*BS(t)+(\gamma)*[BS(t)-BSR(t)-RLC_B(t)+RLC_B(t-1)]$ if($RLC_B(t)-RLC_B(t+1)>\gamma*BSR(t)$)

$BS(t+1)=(1-\gamma)*BS(t)+(\gamma)*[\beta*BS(t)]$ [EQUATION 3]

Herein, RLCB(t) indicates the amount of data standing by in an RLC buffer in time t.

The terminal 100, when using the wireless LAN, receives, from a wireless LAN access point, an opportunity to transmit data using a carrier sense multiple access/collision avoid (CSMA/CA) scheme, which is not a scheduling scheme. The amount of data that can be transmitted by the terminal 100 for each medium access opportunity may be an aggregation size of the MAC layer 1207 of the terminal 100. That is, the terminal 100 determines 1215 the size of the transmission bulk, based on the maximum aggregation size of the MAC layer 1207 of the terminal 100. At this time, the terminal 100 may identify a maximum aggregation size of the MAC layer 1207 through the first interface 1209. Therefore, the terminal 100 determines the size of the transmission bulk, by the maximum aggregation size without using EQUATION 2 and EQUATION 3.

Figure 14:
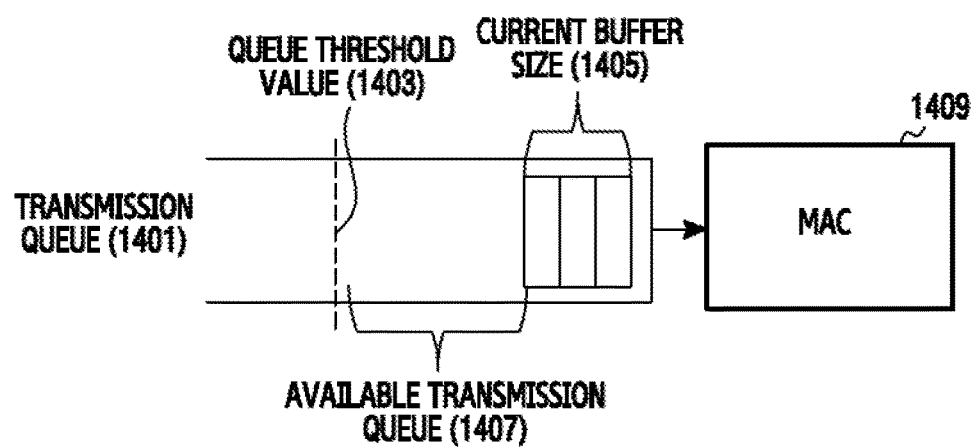
FIG. 14 illustrates an operation for monitoring, by a terminal, a queue state in a wireless communication system according to an embodiment of the present disclosure.

FIG. 14 illustrates an operation for monitoring, by a terminal, a queue state in a wireless communication system according to an embodiment of the present disclosure.

Referring to FIG. 14, the terminal 100 may monitor a state of a transmission queue 1401 of the terminal 100. The transmission queue 1401 is a queue in which a packet to be transmitted by the terminal 100 stands by for transmission. The terminal 100 may monitor a state of the transmission queue 1401, based on a predefined queue threshold value 1403. The queue threshold value 1403 means a reference value that determines a state of the transmission queue 1401. The queue threshold value 1403 may be determined by a transmission bulk size. For example, in case of a wireless LAN, the terminal 100 determines the queue threshold value 1403, based on a transmission bulk size determined by a maximum aggregation size of the MAC layer 1409 of the terminal 100. The queue threshold value 1403, in case of LTE, may be determined by a transmission bulk size determined through EQUATION 2 or EQUATION 3.

The terminal 100 may measure the current buffer size 1405 at every data transmission time. The terminal 100 determines a difference in the buffer size 1405 and the queue threshold value 1403. The terminal 100 determines the difference in the buffer size 1405 and the queue threshold value 1403, by the size 1407 of a packet that can be added.

The terminal 100 may request the size 1407 of a packet that can be added, from a TCP transmission end inside the terminal 100. The terminal 100, when multiple TCP connections exist, may distribute the size 1407 of a packet that can be added to each of multiple TCP transmission ends, to make a request. For example, the terminal 100 may request an increase of a CWND from a TCP transmission end, using "CWND increase (CWI)" command. The CWI includes information relating to a requesting data size and a requesting time.

Figure 15:
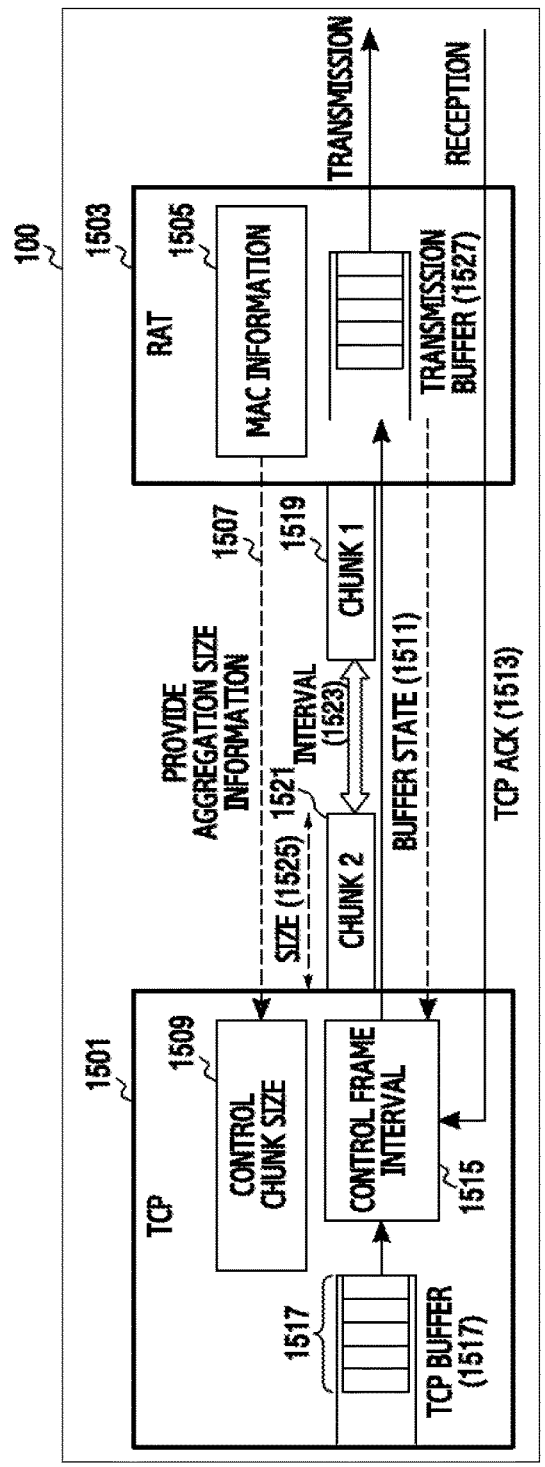
FIG. 15 illustrates an operation for controlling, by a terminal, a TCP layer in a wireless communication system according to an embodiment of the present disclosure.

FIG. 15 illustrates an operation for controlling, by a terminal, a TCP layer in a wireless communication system according to an embodiment of the present disclosure.

Referring to FIG. 15, the terminal 100 controls the size of bulk, based on MAC information. For example, the terminal 100 controls a chunk size of a packet enqueued in a transmission buffer, based on the MAC information 1505.

The terminal 100 controls a transmission interval of the chunk, based on the MAC information 1505. For example, the terminal 100 controls 1515 a frame interval of a chunk of a packet enqueued in a transmission buffer, based on the MAC information 1505.

For example, the terminal 100 controls at least one of the chunk size and a transmission time interval of the chunk, based on at least one of a maximum aggregation size of the MAC layer and a BSR index, a buffer size of an RLC layer and a de-queue interval, and a reception packet of a TCP layer.

The terminal 100 includes a TCP 1501 and a radio access technology (RAT) 1503. The terminal 100 controls the size of the transmission buffer 1527 through the RAT 1503. The terminal 100 transmits information 1507 relating to a maximum aggregation size to the TCP 1501 through the RAT 1503. The terminal 100, through the TCP 1501, controls 1509 the chunk size of the transmission buffer 1527, based on the information 1507 relating to the maximum aggregation size. The terminal 100 transmits information 1511 relating to a transmission buffer status to the TCP 1501 through the RAT 1503. The terminal 100, through the TCP 1501, controls 1515 a transmission frame interval, based on the information 1511 relating to the buffer status. The terminal 100 may generate chunk 1 1519 and chunk 2 1521, based on the determined chunk size 1525. In addition, the terminal 100 transmits the chunk 1 1519 and the chunk 2 1521 to the transmission buffer 1527 according to the determined frame interval.

According to an embodiment of the present disclosure, the terminal 100 may receive TCP ACK 1613 from the server 300 that transmits or receives data to and from the terminal 100. The terminal 100 determines the size 1525 and interval 1523 of the chunk, based on the TCP ACK 1513.

Figure 16:
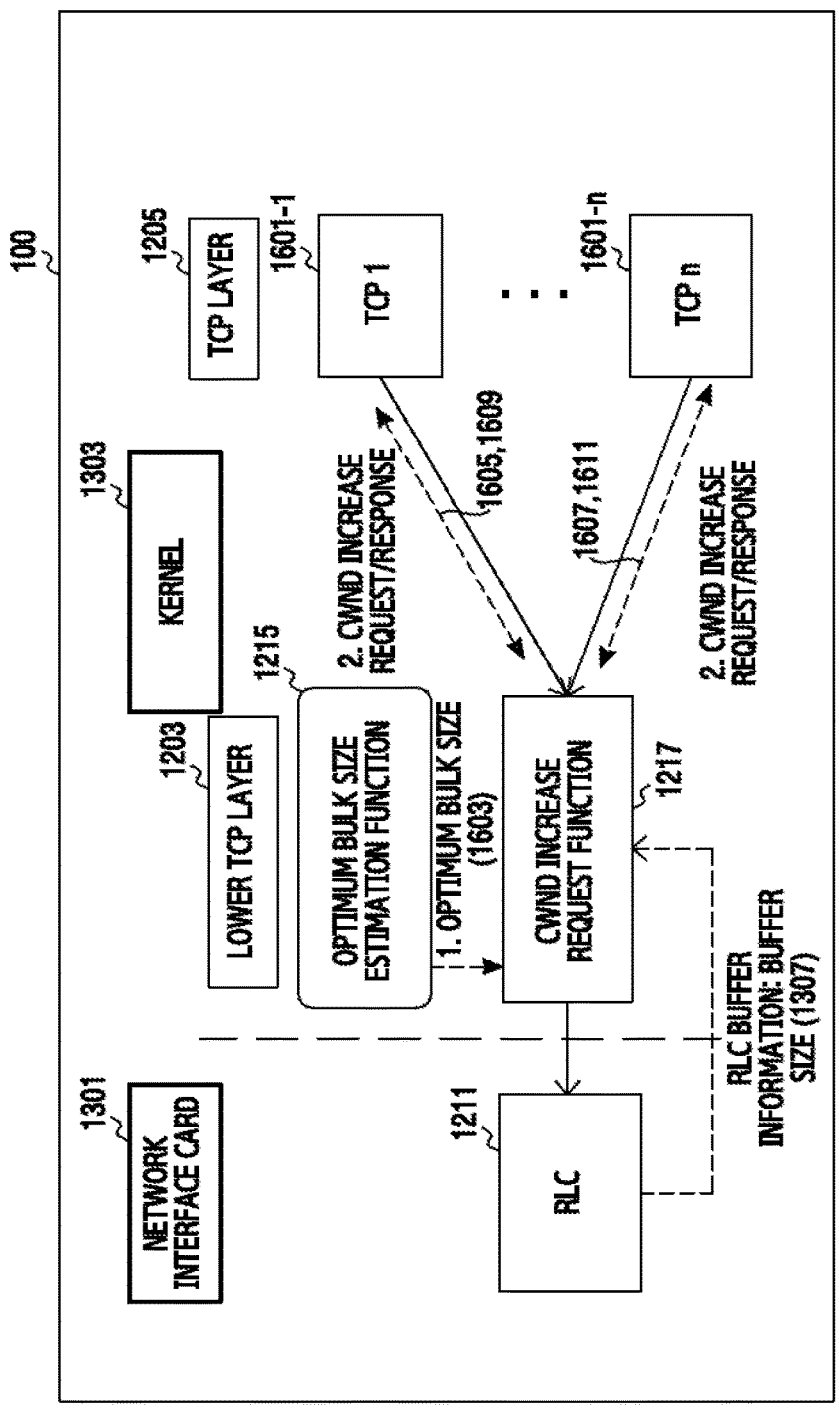
FIG. 16 illustrates an operation for determining a CWND of each TCP, based on the size of transmission bulk determined by a terminal in a wireless communication system according to an embodiment of the present disclosure.

FIG. 16 illustrates an operation for determining a CWND of each TCP, based on the size of transmission bulk determined by a terminal in a wireless communication system according to an embodiment of the present disclosure.

Referring to FIG. 16, the terminal 100 includes the network interface card 1301 and the kernel 1303. The terminal 100 determines 1215 an optimum size of bulk through the lower TCP layer 1203 of the kernel 1303. The terminal 100 performs a request 1217 for an increase of a CWND, based on the determined optimum size of bulk 1603. The terminal 100 performs the request 1217 for an increase of a CWND, based on the optimum size of bulk and RLC buffer information 1307 of the RLC 1211. The RLC buffer information 1307 may be the size of a transmission buffer. The terminal 100 transmits a request message 1605 for an increase of a CWND to TCP 1 1601-1 of the TCP layer 1205, and receives a response 1609 to the request message. In addition, the terminal 100 transmits a request message for an increase of a CWND to TCP n 1601-n of the TCP layer 1205, and receive 1611 a response to the request message. In other words, the terminal 100 may request an increase of a CWND from each of multiple TCP connections of the TCP layer 1205.

The terminal 100 may enable a maximum amount of the data that can be transmitted to stand by in a transmission buffer at every transmission time interval. Data of the amount greater than the maximum amount of the data that can be transmitted may stand by in the transmission buffer of the terminal 100. At this time, the terminal 100 may not be able to transmit data required to be urgently transmitted, due to the data that is standing by in the transmission buffer and the amount thereof is greater than the maximum amount of the data that can be transmitted. Therefore, the terminal 100 controls the size of data standing by in the transmission buffer such that the data of the amount greater than the maximum amount of the data that can be transmitted does not stand by in the transmission buffer.

The terminal 100 determines a maximum amount of data that can be transmitted at every transmission time interval. The terminal 100 determines a difference in a maximum size of the data that can be transmitted and the size of the transmission buffer when the size of data standing by in the transmission buffer of the terminal 100 is smaller than the maximum amount of the data that can be transmitted. The transmission buffer may be a radio link control buffer when the terminal 100 uses a cellular network. The transmission buffer may be an MAC buffer when the terminal 100 uses a wireless LAN. The terminal 100 determines the size of data having a CWND required to be increased, based on the difference in a maximum size of the data that can be transmitted and the size of the transmission buffer.

For example, the terminal 100 determines the size of data having a CWND required to be increased through EQUATION 4 below.

$$\text{if}(RLC_B(t) < BS(t+1))$$

$$CWI(t) = BS(t+1) - RLC_B(t)$$

$$\text{if}(RLC_B(t) > BS(t+1))$$

$$CWI(t) = 0 \quad \text{[EQUATION 4]}$$

Herein, CWI(t) may indicate the size of data having a CWND required to be increased in time t.

At this time, when the size of the radio link control buffer is equal to or greater than the maximum size of the data that can be transmitted, increase of the CWND is not necessary and thus the terminal 100 may not increase the CWND. In addition, the terminal 100 may not transmit, to a modem, a packet to be transmitted to the modem in the TCP connection of the terminal 100 until the size of the radio link control buffer becomes equal to or smaller than the maximum size of the data that can be transmitted. The terminal 100 transmits, to the modem, a packet that has not been transmitted to the modem when a space capable of data transmission is generated in the radio link control buffer.

The terminal 100 may distribute the size of the data having a CWND required to be increased to each of multiple TCP connections of the terminal 100, to make a request. The terminal 100 determines the size of data which will be requested from the multiple TCP connections, based on accuracy among the multiple TCP connections. The terminal 100 determines a weight value with respect to a service quality of an application using a TCP connection. The terminal 100 determines the size of data for making a request from the TCP connection, based on the weight value with respect to a service quality.

For example, the weight value with respect to a service quality of an application may be like TABLE 2 below.

TABLE 2

| Item | Content | Others |
|---|---|---|
| Application type | Application type using TCP | Image, Sound |
| Application state | Current state of application using TCP | Whether or not to use screen or image output |
| | Used for distinguishing background application and foreground application | Whether or not to use speaker or audio output |
| | Capable of identifying whether input/output equipment within terminal, which is used by current application, is in use | Whether or not to use vibrating motor Whether or not to use touch input Whether or not to use microphone |
| Required bandwidth | Bandwidth required by TCP in real time or when transmitting multimedia | Predefined according to application |
| Required latency | Latency required to be guaranteed for TCP in real time or when transmitting multimedia | Predefined according to application |

Figure 17:
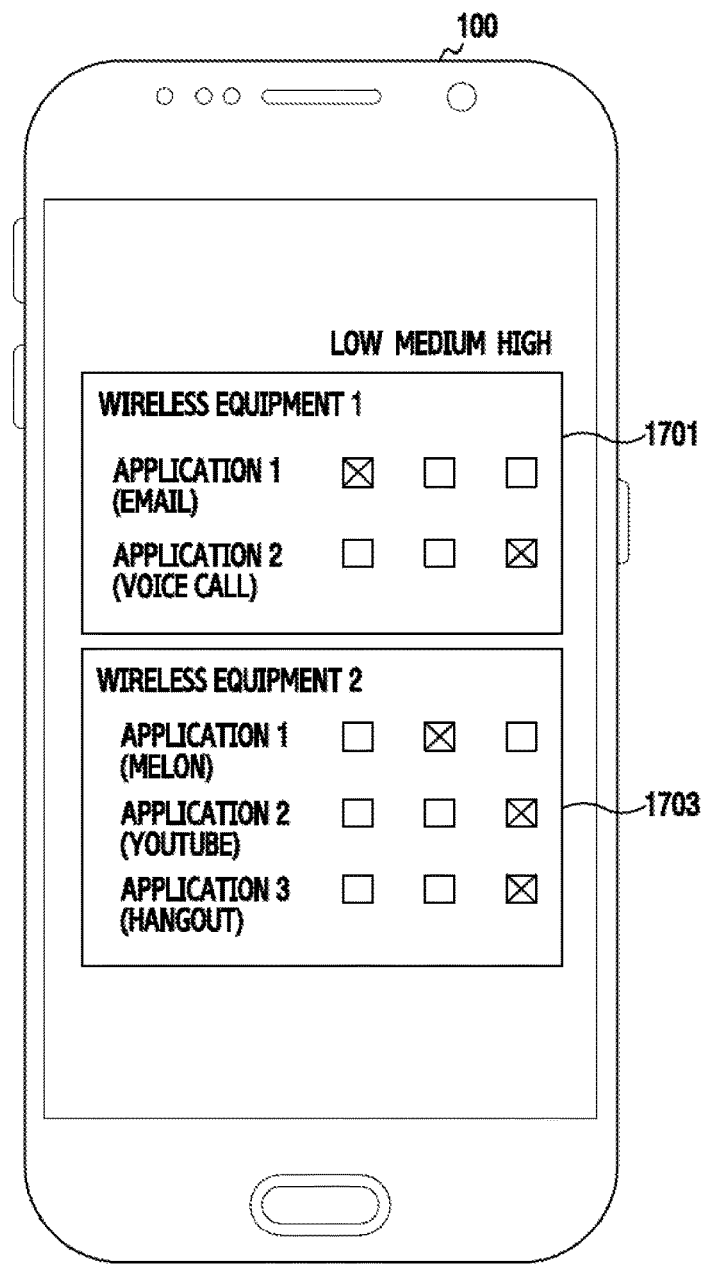
FIG. 17 illustrates a user interface in order to configure a weight value with respect to a service in a wireless communication system according to an embodiment of the present disclosure.

Referring to FIG. 17, according to an another embodiment of the present disclosure, the terminal 100 determines the weight value with respect to a service quality of an application according to a signal input through a user interface 1701, 1703.

For example, the terminal 100 may receive an input of a signal for determining a weight value with respect to an application used by wireless equipment 1 and wireless equipment 2, through the user interface 1701, 1703. For example, the wireless equipment 1 may be a watch-type communication device connected to the terminal 100. The wireless equipment 2 may be an eyeglasses-type communication device connected to the terminal 100.

The terminal 100 may receive, through the user interface 1701, an input of a signal for configuring a weight value with respect to application 1 used by the wireless equipment 1 to be low. The terminal 100 may receive, through the user interface 1701, an input of a signal for configuring a weight value with respect to application 2 used by the wireless equipment 1 to be high.

The terminal 100 may receive, through the user interface 1703, an input of a signal for configuring a weight value with respect to application 1 used by the wireless equipment 2 to be medium, and configuring weight values with respect to application 2 and application 3 to be high. The terminal 100 may request an increase of a CWND from each of TCP connections, based on the determined size of data. The terminal 100 determines one of approved, partially approved, and refused, with respect to the request for an increase of a CWND for each of the multiple TCP connections. That is, the terminal 100 determines whether or not to increase a CWND for each of the multiple TCP connections. For example, the terminal 100, in a case where the terminal 100 will refuse an increase of a CWND with respect to a first TCP connection, may redistribute increment of the refused an increase of a CWND to a second TCP connection. For example, the terminal 100 determines a CWND for each of the TCP connections, through EQUATION 5 below.

$$CWI_1(t)=CWI(t)*W_1/\Sigma_1{}^n W_i \quad \text{[EQUATION 5]}$$

Herein, CWI(t) is increment of a total CWND. CWI1(t) is increment of a CWND for making a request from number one TCP connection. Wi is a weight value with respect to a service quality of number i TCP connection.

Figure 18:
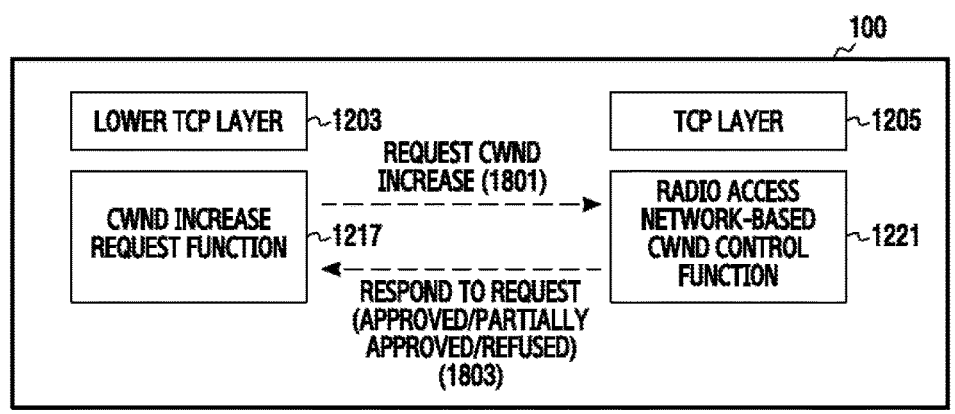
FIG. 18 illustrates an operation for controlling, by a terminal, a CWND of each TCP connection in a wireless communication system according to an embodiment of the present disclosure.

FIG. 18 illustrates an operation for controlling, by a terminal, a CWND of each TCP connection in a wireless communication system according to an embodiment of the present disclosure.

Referring to FIG. 18, the terminal 100 controls a CWND of each of the TCP connections through the lower TCP layer 1203 of the terminal 100 and the TCP layer 1205. The terminal 100 may request an increase of a CWND from the TCP layer 1205 through a function 1217 for making a request for an increase of a CWND of the lower TCP layer 1203. The terminal 100 transmits a response to the request for an increase of a CWND to the lower TCP layer 1203, through the TCP layer 1205.

The terminal 100, in order to avoid congestion of an E2E path, determines whether congestion of the E2E path will occur when increasing a CWND. For example, the terminal 100 determines whether congestion of the E2E path will occur when increasing a CWND, by comparing the sum of the current CWND of each of TCP connections and CWND increment with a slow start threshold value of each of the TCP connections. The terminal 100 may increase the CWND when it is determined that congestion of the E2E path does not occur when increasing the CWND. According to another embodiment of the present disclosure, the terminal 100 may increase CWNDs with respect to some of TCP connections when it is determined that congestion of the E2E path does not occur when increasing the CWND. The terminal 100 may not increase the CWND when it is determined that congestion of the E2E path occurs when increasing the CWND. The terminal 100, when increasing CWNDs with respect to some of the TCP connections, may further increase a CWND of another TCP connection except for some of the TCP connections, CWNDs of which have not been increased. The terminal 100 may request 1801 an increase of a CWND in the lower TCP layer 1203 to TCP layer 1205 of the terminal 100. In addition, the terminal 100 transmits 1803 a response to the request for an increase of a CWND, from the TCP layer 1205 to lower TCP layer 1203 of the terminal 100.

The terminal 100 uses EQUATION 6 below when the terminal 100 increases the CWND.

$$\text{if}(CWND+CI<SST)\rightarrow CWND=CWND+CI \quad \text{[EQUATION 6]}$$

Herein, SST indicates the slow start threshold value.

The terminal 100 uses EQUATION 7 below when the terminal 100 increases CWNDs with respect to some of TCP connections.

$$\text{if}(CWND+CI>SST \&\& CWND<SST)\rightarrow CWND=SST \quad \text{[EQUATION 7]}$$

The terminal 100 uses EQUATION 8 below when the terminal 100 does not increase the CWND.

$$\text{if}(CWND+CI\geq SST)\rightarrow CWND=CWND \quad \text{[EQUATION 8]}$$

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program includes instructions that cause the electronic device to perform the methods according to various embodiments of the present disclosure as defined by the appended claims and/or disclosed herein.

Although the present disclosure has been described with embodiments, various changes and modifications may be suggested to one skilled in the art. It is intended that the present disclosure encompass such changes and modifications as fall within the scope of the appended claims.

What is claimed is:

1. A method for operating a transmission device in a wireless communication system, the method comprising:
   determining a size of data that is available to be transmitted in a transmission time unit, based on network information including information relating to at least one of: a modulation and coding scheme (MCS), our an allocated resource block (RB), when the transmission device transmits or receives data through a first communication module configured to communicate with a mobile communication network;
   distributing the size of the data that is available to be transmitted to each of multiple transmission control protocol (TCP) connections;
   determining transmission rates of the multiple TCP connections, based on the distributed size of the data that is available to be transmitted; and
   transmitting the data to a reception device through the TCP connection based on the determined transmission rates.

2. The method of claim 1, wherein transmitting the data comprises transmitting the data through at least one of the first communication module configured to communicate with the mobile communication network or a second communication module configured to communicate with a wireless local area network (LAN).

3. The method of claim 1, wherein the network information further comprises information relating to a measured buffer size when the transmission device transmits or receives the data through a first communication module configured to communicate with a mobile communication network.

4. The method of claim 1, wherein the network information further comprises information relating to at least one of a maximum aggregation size or a medium access control (MAC) buffer size when the transmission device transmits the data through a second communication module configured to communicate with a wireless local area network (LAN).

5. The method of claim 1, wherein determining the transmission rates comprises:
   determining transmission rates of the multiple TCP connections based on at least one of a number of the multiple TCP connections, weight value information of a service used by each of the multiple TCP connections, or an amount of data transmission used by each of the multiple TCP connections.

6. The method of claim 5, wherein the weight value information comprises information relating to at least one of a type of the service, a function of the transmission device used by the service, a bandwidth for the service, or a latency for the service.

7. The method of claim 5, wherein the weight value information is determined according to a signal input through a user interface of the transmission device, and further comprises displaying the user interface.

8. The method of claim 1, wherein determining the size of data that that is available to be transmitted in the transmission time unit comprises determining a maximum size of data that is available to be transmitted, based on a response message received from the reception device, wherein the response message includes at least one of information relating to a packet lost in the reception device or information relating to a reception memory of the reception device.

9. A transmission device in a wireless communication system, the transmission device comprising:
a first communication module configured to communicate with a mobile communication network;
at least one transceiver; and
at least one processor operably coupled to the at least one transceiver, configured to:
determine a size of data that is available to be transmitted in a transmission time unit, based on network information including information relating to at least one of a modulation and coding scheme (MCS), or an allocated resource block (RB) when the transmission device transmits or receives data through the first communication module,
distribute the size of the data that is available to be transmitted to each of multiple transmission control protocol (TCP) connections, and
determine transmission rates of the multiple TCP connections, based on the distributed size of the data that is available to be transmitted; and
wherein the at least one transceiver is configured to transmit the data to a reception device through the TCP connection based on the determined transmission rates.

10. The transmission device of claim 9, wherein the transceiver comprises a second communication module configured to communicate with a wireless LAN.

11. The transmission device of claim 9, wherein the network information further comprises information relating to a measured buffer size when the transceiver transmits the data through the first communication module.

12. The transmission device of claim 9, wherein the network information further comprises information relating to at least one of a maximum aggregation size or a medium access control (MAC) buffer size when the transceiver transmits the data through a second communication module configured to communicate with a wireless local area network (LAN).

13. The transmission device of claim 9, wherein the at least one processor is, in order to determine the transmission rates, configured to determine transmission rates of the multiple TCP connections, based on at least one of a number of the multiple TCP connections, weight value information of a service used by each of the multiple TCP connections, or an amount of data transmission used by each of the multiple TCP connections.

14. The transmission device of claim 13, wherein the weight value information comprises information relating to at least one of a type of the service, a function of the transmission device used by the service, a bandwidth for the service, or a latency for the service.

15. The transmission device of claim 13, wherein the weight value information is determined according to a signal input through a user interface of the transmission device, or further comprises a display configured to display the user interface.

16. The transmission device of claim 9, wherein at least one processor is, in order to determine the transmission rates of the TCP connection, configured to determine a maximum size of data that is available to be transmitted, based on a response message received from the reception device wherein the response message includes at least one of information relating to a packet lost in the reception device or information relating to a reception memory of the reception device.

* * * * *